July 5, 1938. W. H. BAUM 2,122,906
MEASURING SPOUT FOR RECEPTACLES
Filed Dec. 4, 1937
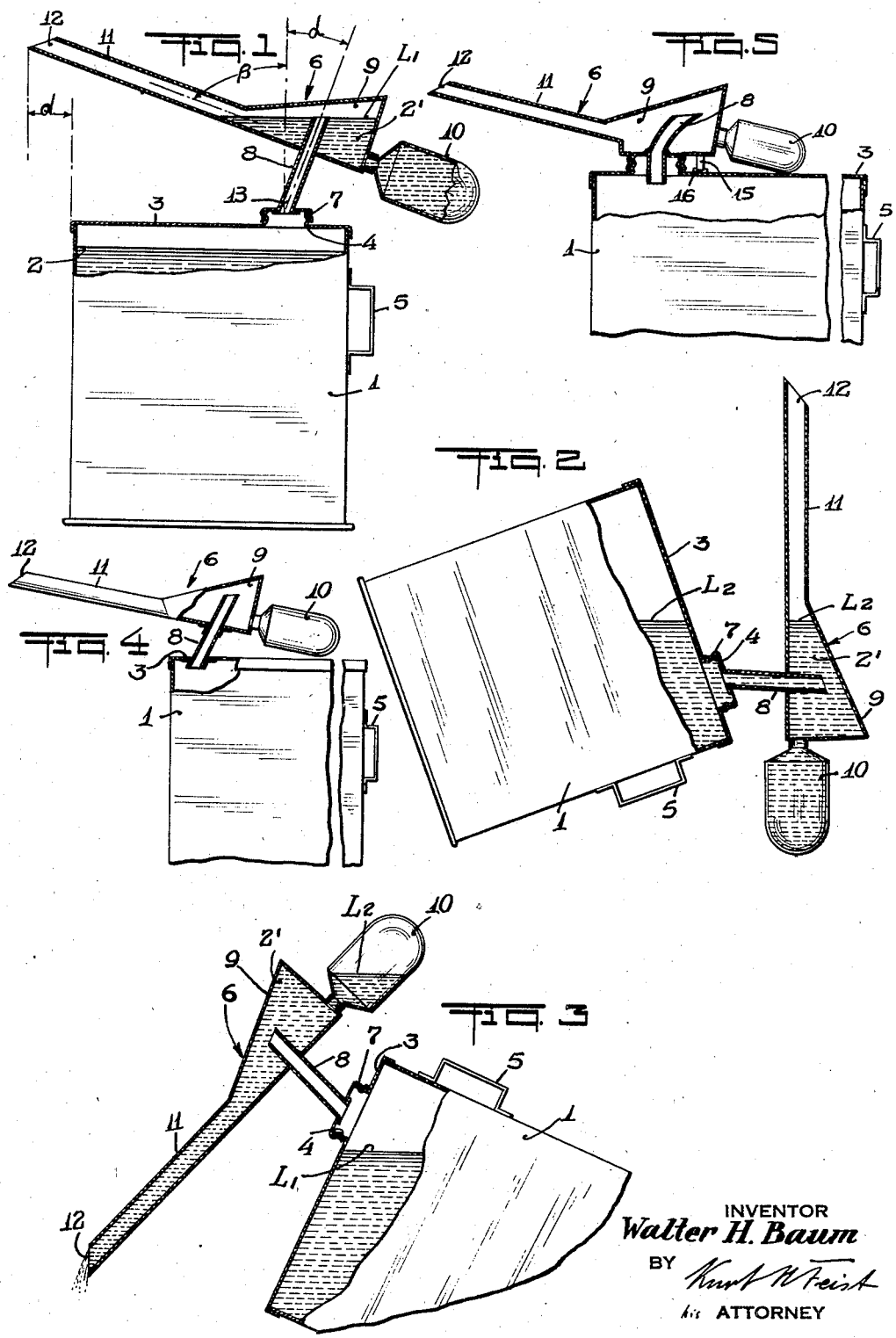
INVENTOR
Walter H. Baum
BY
his ATTORNEY Patented July 5, 1938

2,122,906

UNITED STATES PATENT OFFICE 2,122,906

MEASURING SPOUT FOR RECEPTACLES

Walter H. Baum, New York, N. Y.

Application December 4, 1937, Serial No. 178,018

3 Claims. (Cl. 221—98)

My invention relates to measuring devices, and more particularly to a measuring spout for all types of receptacles.

One object of my invention is to provide a spout for receptacles, by means of which a certain amount of liquid as required for a particular instance may be poured out of the receptacle in which the liquid is stored.

Preferably, I provide a separate measuring spout which may be attached to any type of receptacle and may readily be removed after the receptacle has been emptied and then attached to another receptacle. Another object of my invention, however, is to provide a receptacle, such as a can, which is equipped with a measuring spout rigidly attached thereto.

In order to carry out my invention into practice, I use a measuring spout comprising a base having a passage, means adapted to connect said base with an outlet of a receptacle, a measuring chamber, and a tube connecting said measuring chamber with said passage, the middle axis of said tube being inclined to the middle axis of said base, the upper end of said tube extending into said measuring chamber for a predetermined length determining the amount of liquid to be measured in said chamber, the measuring chamber being provided with a discharge opening arranged at a level above the upper end of said tube, and the bottom of said measuring chamber being inclined in an upward direction relative to the middle axis of said base.

My new measuring spout is especially adapted for the application to cans containing so-called "upper lubrication oil" or "top cylinder oil". This oil is distributed to the gasoline stations in cans containing a comparatively large quantity of the liquid, while only a certain small amount of oil depending on the amount of gasoline requested by the driver of a car may be added to the gasoline in the tank of the car. The use of my new measuring spout facilitates the addition of the "upper lubrication oil" to the gasoline and permits the addition of the proper amount of oil as required for the obtainance of correct proportions of oil and gasoline.

The above objects as well as others not particularly pointed out will appear from the following description with reference to the accompanying drawing in which the reference characters in the several figures denote like parts, and in which Fig. 1 is a front elevational view of a can provided with a measuring spout screwed thereon, partially in section, Fig. 2 is a view similar to Fig. 1, the can, however, being shown in another position to fill the measuring spout with liquid, Fig. 3 is a view similar to Fig. 1, the can, however, being shown in still another position, to pour out the liquid from the measuring spout, Fig. 4 is a partial view of a can having a measuring spout rigidly attached thereto, partially in section, and Fig. 5 is a partial view of another embodiment and arrangement of the measuring spout on a can, partially in section.

Referring now to Figs. 1–3, 1 denotes a conventional can containing the liquid 2. The upper wall 3 of said can is provided with an outlet 4 usually closed by a cap or cover (not shown in the drawing) which is screwed on the threaded wall of said outlet. 5 indicates a handle secured to a side wall of the can.

6 generally indicates a separate measuring spout, which comprises a base 7, an inclined connecting tube 8, a measuring chamber 9, 10, and an extension 11 connected to the measuring chamber and provided with a discharge opening 12. The base 7 is screw-threaded and may be screwed on the outlet 4 of the can 1 after the removal of the conventional closing cap or cover (not shown in the drawing). The tube 8 is inserted into a passage 13 arranged in the base 7 and is rigidly attached to the base by soldering for example. The middle axis of the tube is inclined to the middle axis of the base 7. It has been found that the angle $\alpha$ between the middle axes of the tube and the base should be between 20° and 50°, preferably 20°, in order to obtain an easy filling and emptying of the measuring chamber as will be described later on. The tube 8 connected to the measuring chamber 9, 10 extends for a certain distance into said measuring chamber and determines the amount of liquid to be measured in said measuring chamber. Preferably, the compartment 9 of the measuring chamber is made of an opaque material, such as tin, iron sheet or the like. In order to render visible to the customer, the measured amount of liquid, a part of the measuring chamber may be made of transparent material, such as glass, celluloid or artificial resin, the last mentioned materials being substantially non-breakable. In the preferred embodiment shown in the drawing, a casing 10 of transparent material is connected to the opaque compartment 9 of the measuring chamber and communicates therewith. The casing 10 projects beyond the wall of the can carrying the handle 5. If desired, a measuring scale may be printed, stamped or stenciled on the surface of said transparent part of the measuring chamber. The bottom of the measuring chamber as well as the extension 11 are inclined in an upward direction relative to the middle axis of the base. Preferably, the angle β between the axes of the extension and of the base is between 50° and 80°. The discharge opening 12 is at a level above the upper end of the tube 8. Thus, on one hand the liquid which has entered into the measuring chamber, cannot overflow over the opening 12 during the filling operation and on the other hand the liquid may be easily poured out through the discharge opening of the spout without an undesired entrance of fresh liquid from the can into the measuring chamber during the discharging operation. As shown in Fig. 1, the extension 11 projects beyond the side wall of the can 1 for a distance $d$ of at least ½ inch.

The operation of the measuring spout is as follows: As mentioned above, the measuring spout is screwed on the outlet 4 of the can 1 after the removal of the conventional closing cap or cover therefrom. If a certain amount of liquid is to be poured out from the can, the cover provided with the measuring spout is tilted into the position shown in Fig. 2, so that the liquid flows through the tube 8 into the measuring chamber 9, 10. Depending on the amount of liquid being in the can, the level of the liquid will be at $L_2$ in this backward tilted position. Then, the can is returned into its normal position shown in Fig. 1, whereby the superfluous liquid returns through the tube 8 into the can until the surface of the liquid is at the same level $L_1$ as the upper end of the tube 8. The amount of liquid 2' to be measured is retained in the measuring chamber 9, 10. In order to pour out the measured liquid, the can is tilted forwardly as shown in Fig. 3. The inclination of the tube 8 and of the bottom of the measuring chamber 9, 10 and of the extension 11 relative to the middle axis of the base prevent fresh liquid in the can from entering into the measuring chamber during this discharging operation. If the liquid is removed from the measuring spout, the can is returned into its normal position and the device is ready for another measuring and discharging operation.

Fig. 4 shows another embodiment of my invention, according to which the measuring spout 6 is rigidly connected to the can. In this instance, the base of the measuring spout may be omitted, and the tube 8 is inserted into an opening 14 in the upper wall of the can and is soldered thereto, so that the can and measuring spout form an integral body. The spout is arranged in such a way, that the transparent casing 10 of the measuring chamber is placed in a protected position above the upper wall of the case. This arrangement is of advantage, if the casing is made of a breakable material, such as glass.

If desired, the protected position of the casing 10 may be secured also for a separate measuring spout to be screwed on the outlet of a can as described in connection with Figs. 1–3. For example, Fig. 5 shows a member 15 arranged on the measuring spout, which may be brought into a position or is in a position to engage with an abutment 16 on the can, in order to have the casing 10 placed above the upper wall of the can, but any other means, such as a set screw or a bayonet closure, which is adapted to secure a certain relationship between the base 7 and the outlet 4, may be used.

Furthermore, Fig. 5 shows another embodiment of the tube 8. In this instance, the lower end of tube 8 extends into the outlet 9 and the can 1. The middle axis of said lower end of the tube is in a substantially vertical position. The upper part of the tube 8 follows a curved line. If desired, the tube shown in the other figures of the drawing could be provided with a similar vertical lower extension, or the tube shown in said figures could follow a similar curved line instead of being inclined in a straight line.

I have described preferred embodiments of my invention, but it is clear that numerous changes and omissions may be made without departing from the spirit of my invention.

What I claim is:

1. A measuring spout for a receptacle provided with an outlet, comprising: a base having a passage, means adapted to connect said base with said outlet, a measuring chamber, said measuring chamber comprising a compartment of opaque material and a casing of transparent material communicating with said compartment, and a tube connecting said measuring chamber with said passage, the middle axis of said tube being inclined to the middle axis of said base by an angle of about 20°, the upper end of said tube extending into said measuring chamber for a predetermined length determining the amount of liquid to be measured in said chamber, the measuring chamber being provided with a discharge opening arranged at a level above the upper end of said tube, and the bottom of said measuring chamber being inclined in an upward direction relative to the middle axis of said base.

2. A measuring spout for a receptacle provided with an outlet as claimed in claim 1 in which said transparent casing of the measuring chamber is made of a non-breakable material.

3. A measuring spout for a receptacle provided with an outlet, comprising: a base having a passage, means adapted to connect said base with said outlet, a measuring chamber, said measuring chamber comprising a compartment of opaque material and a casing of transparent material communicating with said compartment, means adapted to secure a certain relationship between said base and said outlet placing said casing of transparent material in a protected position over said receptacle, and a tube connecting said measuring chamber with said passage, the middle axis of said tube being inclined to the middle axis of said base, the upper end of said tube extending into said measuring chamber for a predetermined length determining the amount of liquid to be measured in said chamber, the measuring chamber being provided with a discharge opening arranged at a level above the upper end of said tube, and the bottom of said measuring chamber being inclined in an upward direction relative to the middle axis of said base.

WALTER H. BAUM.